US012590642B2

(12) United States Patent
Valencia et al.

(10) Patent No.: US 12,590,642 B2
(45) Date of Patent: Mar. 31, 2026

(54) BYPASS VALVES FOR POOL HEATERS

(71) Applicant: Rheem Manufacturing Company, Atlanta, GA (US)

(72) Inventors: Ryan Joseph Valencia, Oxnard, CA (US); Alexander Stephen Chow, Camarillo, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 161 days.

(21) Appl. No.: 18/467,254

(22) Filed: Sep. 14, 2023

(65) Prior Publication Data
US 2024/0102565 A1  Mar. 28, 2024

Related U.S. Application Data

(60) Provisional application No. 63/410,419, filed on Sep. 27, 2022.

(51) Int. Cl.
| | |
|---|---|
| *F16K 15/06* | (2006.01) |
| *F16K 17/04* | (2006.01) |
| *F24D 19/10* | (2006.01) |
| *F24F 12/00* | (2006.01) |
| *F24H 15/325* | (2022.01) |

(52) U.S. Cl.
CPC .......... *F16K 15/067* (2021.08); *F16K 15/063* (2013.01); *F16K 17/04* (2013.01); *F24D 19/1021* (2013.01); *F24H 15/325* (2022.01); *F24F 2012/007* (2013.01); *F28F 2250/06* (2013.01)

(58) Field of Classification Search
CPC .. F16K 2200/40; F16K 17/04; F16K 17/0413; F16K 15/067; F16K 15/063; F24F 2012/007; F24H 15/325; F28F 2250/06; F24D 19/1021
See application file for complete search history.

(56) References Cited

U.S. PATENT DOCUMENTS

| | | | | |
|---|---|---|---|---|
| 4,693,269 A | * | 9/1987 | Yamada ................ | F16K 15/063 137/514.7 |
| 2002/0021742 A1 | * | 2/2002 | Maskell .................. | F28F 27/02 137/115.26 |

FOREIGN PATENT DOCUMENTS

| | | | | |
|---|---|---|---|---|
| CN | 110762283 A | * | 2/2020 | ............. F16K 17/00 |

\* cited by examiner

*Primary Examiner* — Atif H Chaudry
(74) *Attorney, Agent, or Firm* — Eversheds Sutherland (US) LLP

(57) ABSTRACT

Bypass valves for pool heaters are disclosed. Embodiments may include pool heaters with a heat exchanger, a support, and an automatic bypass valve coupled to the support. The automatic bypass valve may include a cylindrical bypass shaft, and a bypass valve having a non-circular opening configured to receive the bypass shaft, where the bypass valve is configured to slide along the cylindrical bypass shaft responsive to water pressure in the heat exchanger, and where water and debris can flow through the non-circular opening when the bypass valve is in a closed position.

18 Claims, 5 Drawing Sheets

Water Flow

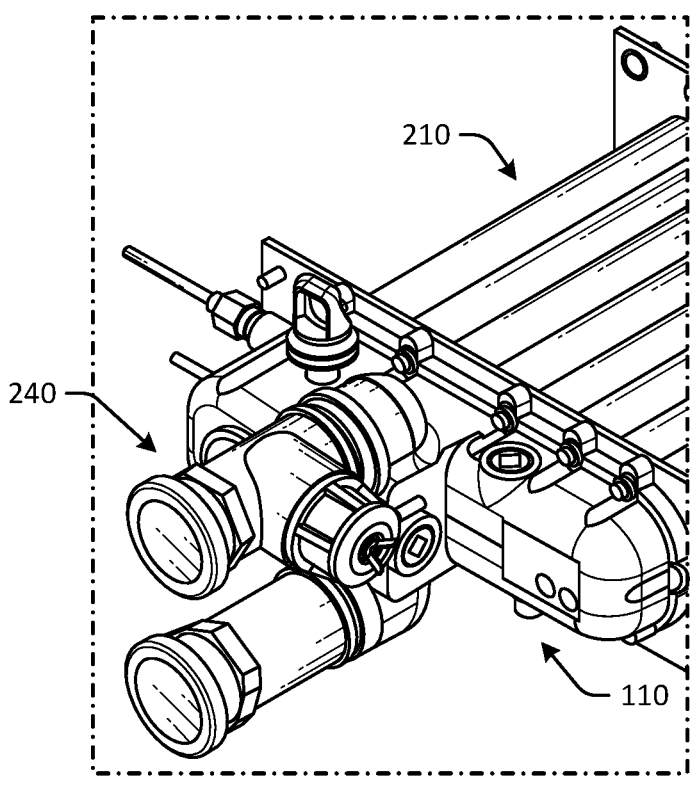
FIG. 2B
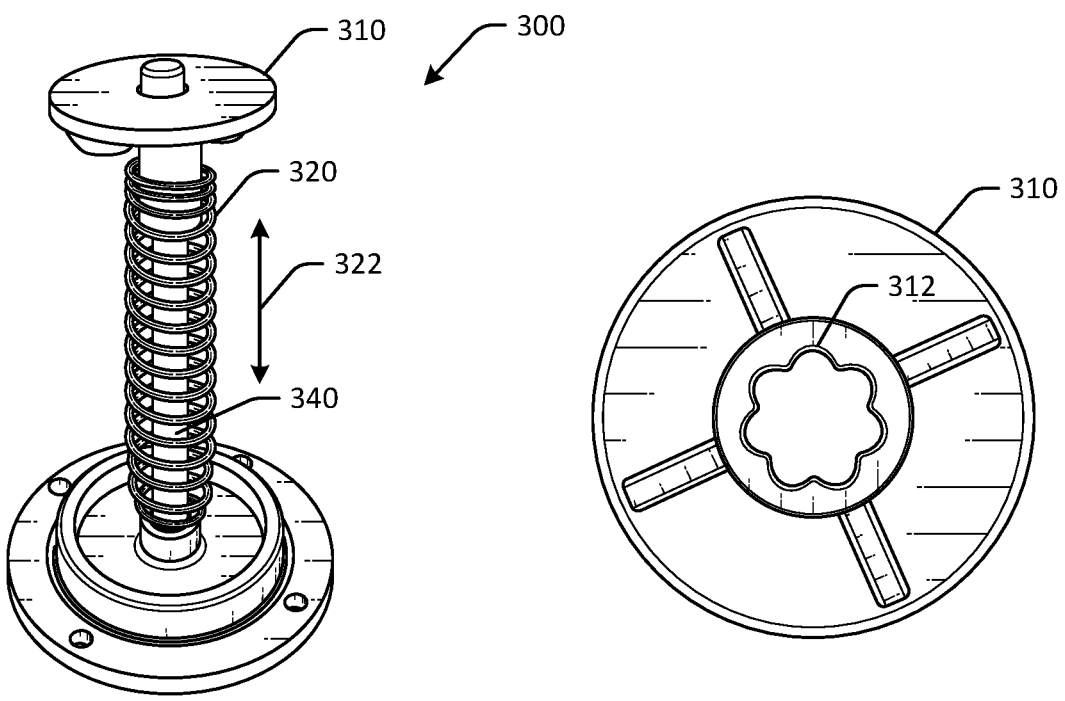
FIG. 3A                              FIG. 3B

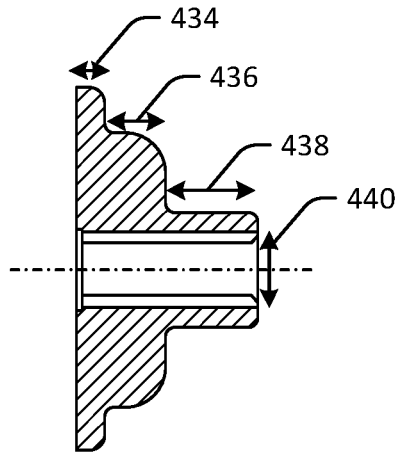
FIG. 4B
FIG. 4C
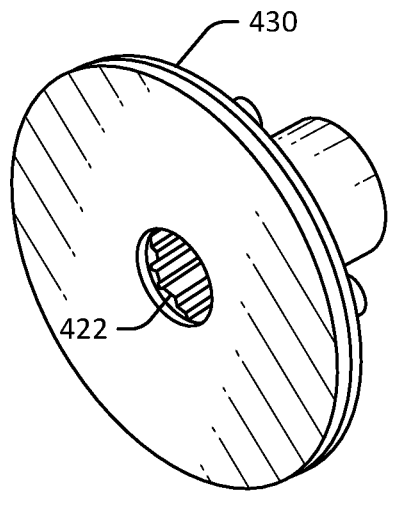
FIG. 4D
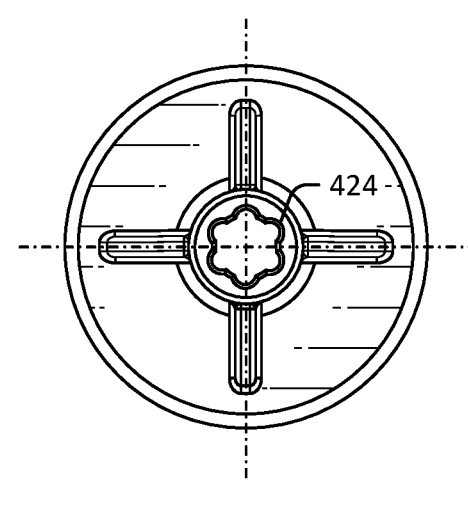
FIG. 4E

BYPASS VALVES FOR POOL HEATERS

CROSS-REFERENCE TO RELATED APPLICATION

This application claims the benefit of U.S. Application Ser. No. 63/410,419, filed Sep. 27, 2022, the entirety of which is hereby incorporated by reference.

FIELD

This disclosure relates generally to pool heaters and more particularly to valves for pool heaters.

BACKGROUND

Pool heaters may be used to heat water in pools, and may include heat exchangers used to heat water flowing through the pool heater. By heating water flowing through the pool heater, pool water temperature can be managed and customized for users of the pool.

As water flows into the pool heater, filters may be used to filter the water upstream of the pool heater and/or upstream of a heat exchanger of the pool heater. Such filters may prevent objects from entering and damaging the pool heater. However, small objects, such as debris, grains of sand, small rocks, etc. may pass through such filters and flow into the pool heater. Such small objects may damage components of the pool heater, clog valves, and/or otherwise degrade pool heater operation. Accordingly, bypass valves for pool heaters may be desired.

BRIEF DESCRIPTION OF THE DRAWINGS

The detailed description is set forth with reference to the accompanying drawings. In some instances, the use of the same reference numerals may indicate similar or identical items. Various embodiments may utilize elements and/or components other than those illustrated in the drawings, and some elements and/or components may not be present in various embodiments. Throughout this disclosure, depending on the context, singular and plural terminology may be used interchangeably.

FIG. 2B illustrates a perspective view of the heat exchanger of FIG. 2A in an assembled configuration in accordance with one or more embodiments of the present disclosure.

FIG. 3A illustrates an automatic bypass valve in an uncompressed configuration in accordance with one or more embodiments of the present disclosure.

FIG. 3B illustrates the bypass valve of FIG. 3A in an isolated bottom view in accordance with one or more embodiments of the present disclosure.

FIGS. 4A-4E illustrate a bypass valve component of an automatic bypass valve in various views in accordance with one or more embodiments of the present disclosure.

DETAILED DESCRIPTION

This disclosure relates generally to pool heaters and more particularly to bypass valves for pool heaters. Some embodiments include automatic bypass valves that are less likely to clog and/or jam due to buildup of debris, such as grains of sand, that passes through filters of a pool water system and/or pool heater. As a result of sand, dirt, and other debris, bypass valves of pool heaters may jam over time and be ineffective at allowing water to bypass and/or controlling the water flow through a pool heater, which can lead to damage or failure of a pool heater heat exchanger. Repair of such damage or failure may be expensive and undesirable. Some bypass valves as described herein include apertures or openings formed about an internal surface of a bypass valve, where such apertures or openings allow debris to flow through the bypass valve itself (e.g., between the bypass valve and the bypass shaft along which it slides, etc.), thereby providing a pass-through or bypass for debris and reducing a likelihood that the bypass valve clogs or is jammed due to debris. Some embodiments may include openings formed in certain patterns, such as star-shaped or regular hexagonal patterns, with or without extended round, cutout or notched vertices. As a result, heat exchanger damage due to jammed or inoperable bypass valves is greatly reduced. Accordingly, embodiments may provide advantages in certain operating conditions, such as conditions where sand enters a pool heater and passes through filters upstream of an automatic bypass valve of the pool heater.

In one embodiment, a pool heater may include a filter, a heat exchanger, a support, and an automatic bypass valve coupled to the support. The automatic bypass valve may include a cylindrical bypass shaft, and a bypass valve having a non-circular aperture configured to receive the bypass shaft, where the bypass valve is configured to slide along the cylindrical bypass shaft responsive to water pressure in the heat exchanger. Water and debris can flow through the non-circular aperture when the bypass valve is in a closed position.

In another embodiment, a heater may include a water filter, a heat exchanger, and an automatic bypass valve coupled to the support. The automatic bypass valve may include a bypass shaft, a spring disposed about the bypass shaft, and a bypass valve having an aperture or opening configured to receive the bypass shaft, where water can flow through at least a portion of the aperture when the bypass valve is in a closed position.

In another embodiment, a pool heater may include a filter, a heat exchanger, a support, and an automatic bypass valve coupled to the support. The automatic bypass valve may include a bypass shaft, a spring disposed about the bypass shaft, and a bypass valve having an aperture configured to receive the bypass shaft, where debris can flow through at least a portion of the aperture when the bypass valve is in a closed position.

Figure 1A:
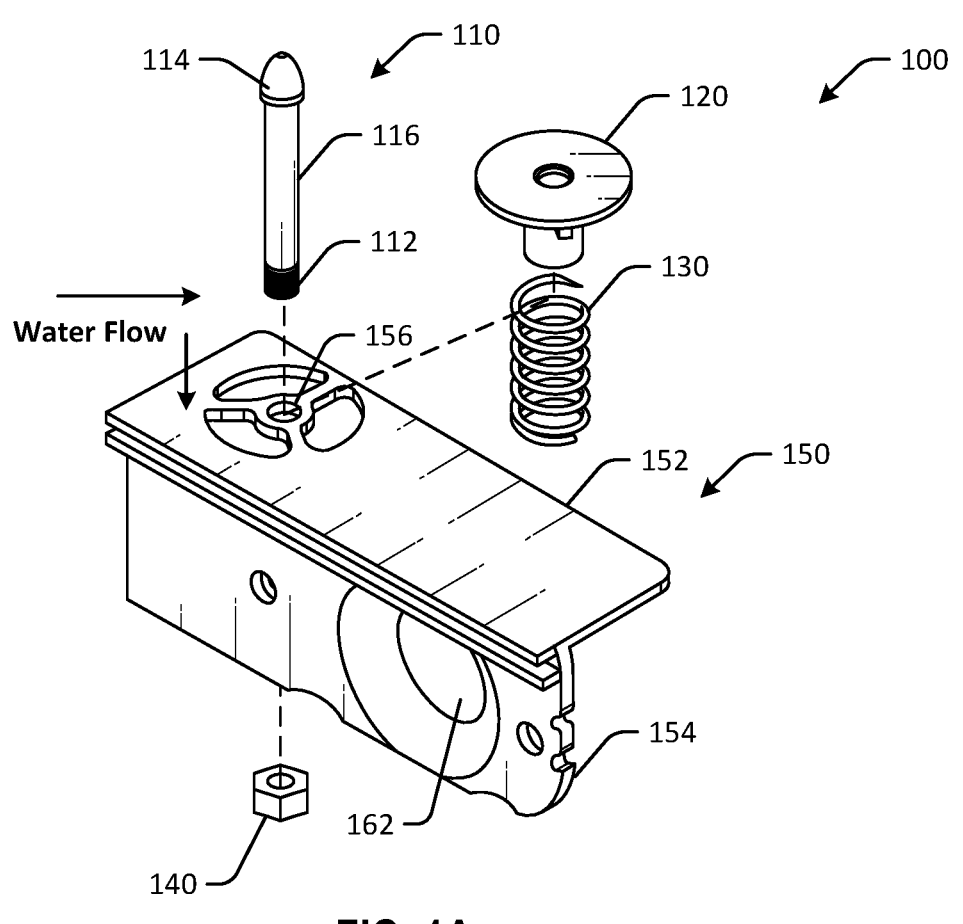
FIG. 1A illustrates an exploded view of an automatic bypass valve for a pool heater in accordance with one or more embodiments of the present disclosure.
Figure 1B:
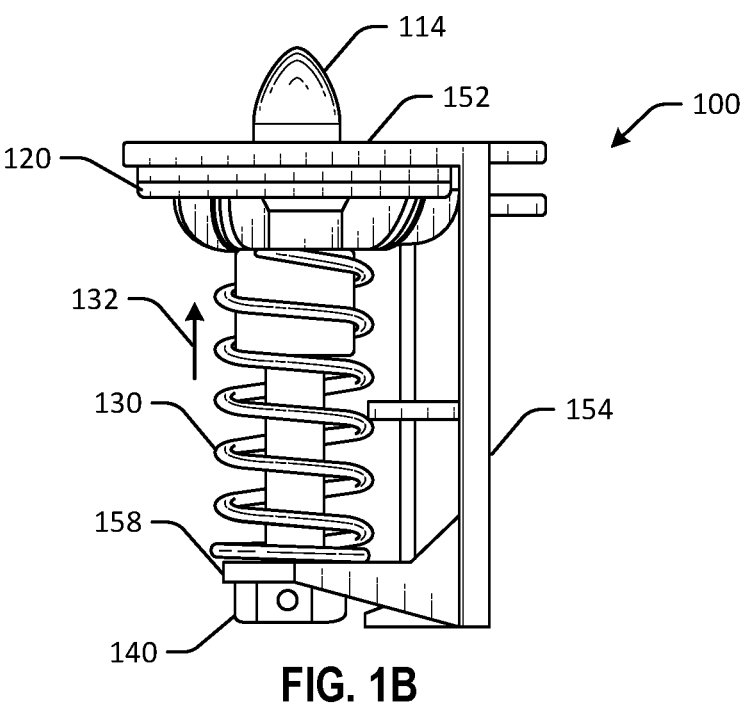
FIG. 1B illustrates a side view of the automatic bypass valve of FIG. 1A in an assembled configuration in accordance with one or more embodiments of the present disclosure.

Referring to FIGS. 1A-1B, FIG. 1A illustrates an exploded view of an automatic bypass valve 110 for a pool heater 100, and FIG. 1B illustrates a side view of the automatic bypass valve 110 of FIG. 1A in an assembled configuration in accordance with one or more embodiments of the present disclosure. Other embodiments may have different configurations and/or may include additional, fewer, or different components. Some components may not be depicted at scale relative to other drawings.

In FIGS. 1A-1B, a portion of the pool heater 100 is depicted with the automatic bypass valve 110. The pool heater 100 may include a support 150 having one or more openings through which water may pass. The illustrated portion of the pool heater 100 may be disposed upstream of a heat exchanger of the pool heater 100, as discussed with respect to FIGS. 2A-2B. The support 150 may include a first portion 152 and a second portion 154. The first portion 152 may be disposed transverse to the second portion 154, such as perpendicular to the second portion 154. The first portion 152 and the second portion 154 may be a single piece assembly or may be formed in multiple pieces. The support 150 may include a first opening or first aperture 156 formed on the first portion 152, and may include a second opening or second aperture 162 formed on the second portion 154. The first aperture 156 may support the automatic bypass valve 110, and water may flow through the second aperture 162.

The automatic bypass valve 110 may be coupled to the support 150. For example, the automatic bypass valve 110 may include a bypass shaft 116, a bypass valve 120 that slides along the bypass shaft 116, and a compression spring 130 that compresses or decompresses based on movement of the bypass valve 120. The bypass shaft 116 may be cylindrical in some embodiments. The bypass shaft 116 may have an optionally threaded first end 112 and an end cap or a flange 114 or other securing component at a second end. The bypass shaft 116 may be disposed at least partially in the first aperture 156. The flange 114 of the bypass shaft 116 may have a greater diameter than the diameter of the first aperture 156, so as to secure the bypass shaft 116 to the support 150 and/or prevent the bypass shaft 116 from falling through the first aperture 156. The support 150 may include a third portion 158 that extends from the second portion 154, where the third portion 158 includes an aperture through which the first end 112 of the bypass shaft 116 passes. A lug nut 140 or other fastener may be used to secure the bypass shaft 116 to the support 150. In other embodiments, the first end 112 may attach directly to the third portion 158, via a suitable connection means, such as a friction fit.

The bypass valve 120 may be disposed about the bypass shaft 116, such that the bypass valve 120 is slidable along the bypass shaft 116 between the first portion 152 and the third portion 158 of the support 150. The spring 130 may be disposed between the third portion 158 of the support 150 and the bypass valve 120, and may be configured to bias the bypass valve 120 in direction 132 toward the first portion 152 of the support 150.

As water flows from the pool and into the pool heater 100, the water flows about the support 150. Depending on water pressure downstream of the support 150 in the heat exchanger, for example, the water pressure about the support 150 may cause the automatic bypass valve 110 to open, thereby allowing management of downstream water pressure by providing a bypass path for the water about the support 150, and avoiding excessively high water pressure in the heat exchanger and preventing damage.

To open, the bypass valve 120 of the automatic bypass valve 110 may be forced toward the third portion 158 of the support 150 due to water pressure incident on the upper surface of bypass valve 120 through the first aperture 156, and may overcome spring force applied by the spring 130. Sample spring force may include, but may not be limited to, 10-100 pounds per square inch. As the bypass valve 120 moves, the spring 130 may compress, and water may flow through openings in first portion 152 to bypass the heat exchanger via the automatic bypass valve 110. Accordingly, the greater the bypass valve 120 compresses the spring 130, the greater the amount of water that can flow through the automatic bypass valve 110.

Once the water pressure about the support 150 is at a desired level, the spring 130 may force the bypass valve 120 back adjacent to the first portion 152 of the support 150, and the automatic bypass valve 110 may return to a closed position, as depicted in FIG. 1B. The upper surface of the bypass valve 120 may be flush with the first portion 152 of the support 150 in the closed position. However, when in the closed position, the bypass valve 120 may define one or more openings disposed about the internal surface of the bypass valve 120 that is in contact with the bypass shaft 116, such that even in the closed position, a small amount of water can flow through the automatic bypass valve 110 via the openings defined by the bypass valve 120. In some embodiments, the aperture of the bypass valve 120 in which the bypass shaft 116 is positioned may be a non-circular aperture, as illustrated in FIGS. 3B-4E. That is, the surface profile of the aperture may define a non-circular shape that extends longitudinally along the inner surface of the length of the aperture. This allows debris, such as sand, dirt, and so forth, to continually pass through the automatic bypass valve 110 without building up in the space between the bypass valve 120 and the bypass shaft 116, and prevent the automatic bypass valve 110 from getting clogged, where the bypass valve 120 may get stuck to the bypass shaft 116 due to the buildup. Embodiments of the bypass valve 120 and example openings are discussed in more detail with respect to FIGS. 3A-4E.

Figure 2A:
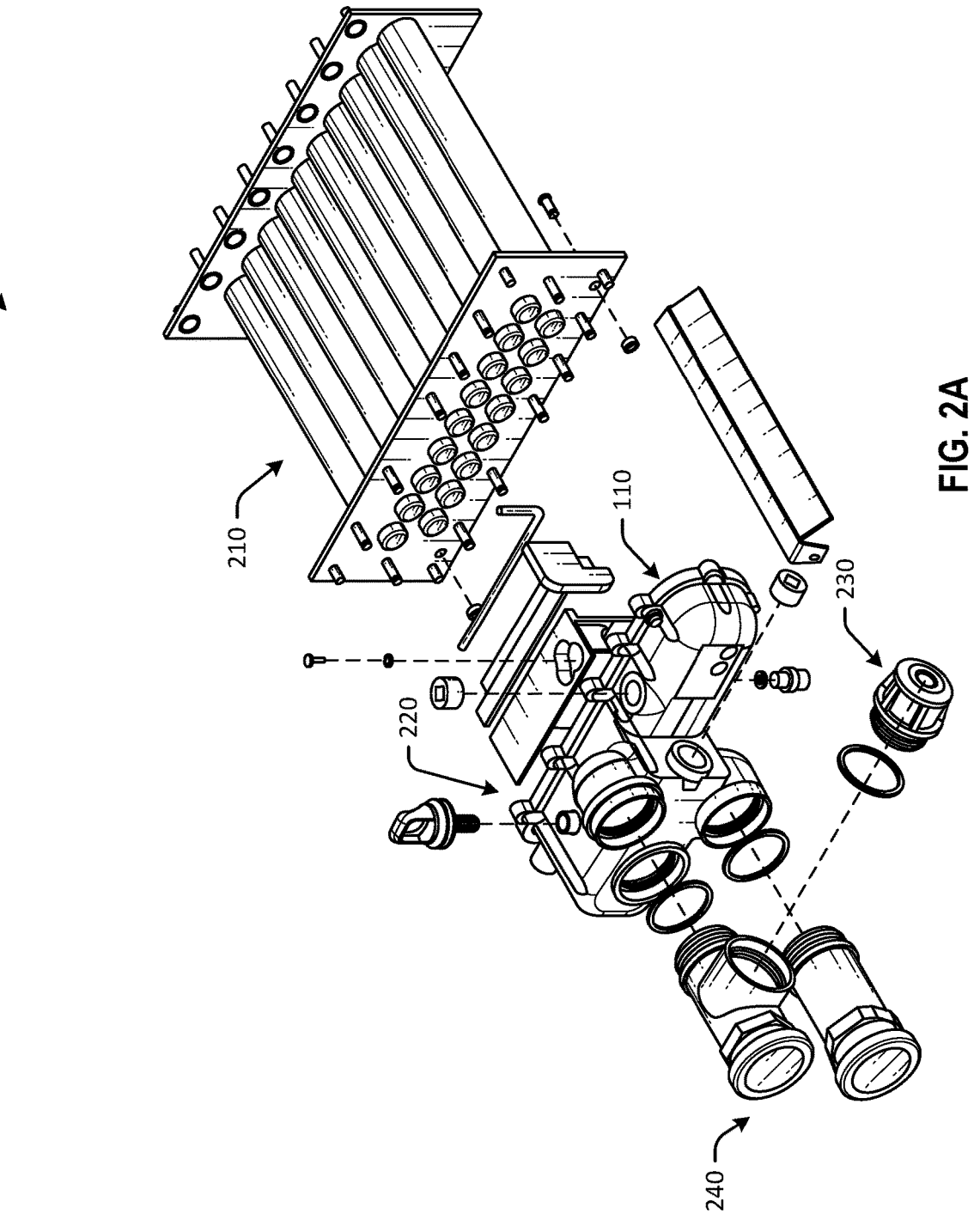
FIG. 2A illustrates an exploded view of a heat exchanger having an automatic bypass valve in accordance with one or more embodiments of the present disclosure.

FIG. 2A illustrates an exploded view of a heat exchanger 200 of a pool heater, the heat exchanger 200 having an automatic bypass valve, and FIG. 2B illustrates a perspective view of the heat exchanger 200 of FIG. 2A in an assembled configuration in accordance with one or more embodiments of the present disclosure. Other embodiments may have different configurations and/or may include additional, fewer, or different components. Some components may not be depicted at scale relative to other drawings.

In FIG. 2A, the pool heater may have the automatic bypass valve 110 of FIGS. 1A-1B. The automatic bypass valve 110 may be positioned internally at the portion 100 of the heat exchanger 200 depicted in FIGS. 1A-1B. The heat exchanger 200 may have a heat exchanger 210, a manifold or a header 220, an access device 230, and one or more inlets and outlets 240. The automatic bypass valve 110 may be disposed downstream of one or more filters, such as a filter of the heat exchanger 200, or a filter external to the heat exchanger 200. The automatic bypass valve 110 may be upstream of the heat exchanger 210. The heat exchanger 200 may include an optional filter, the heat exchanger 210, a support as described with respect to FIGS. 1A-1B (e.g., where the support may be disposed upstream of the heat exchanger 210, etc.), and the automatic bypass valve 110. The automatic bypass valve may include a bypass valve having a non-circular aperture configured to receive a bypass shaft, where the bypass valve is configured to slide along the bypass shaft responsive to water pressure in the header 220. Water and debris can flow through the non-circular aperture of the bypass valve when the bypass valve is in a closed position.

FIG. 3A illustrates an automatic bypass valve 300 in an uncompressed configuration, and FIG. 3B illustrates the bypass valve 300 of FIG. 3A in an isolated bottom view in accordance with one or more embodiments of the present disclosure. Other embodiments may have different configurations and/or may include additional, fewer, or different components. Some components may not be depicted at scale relative to other drawings.

In FIG. 3A, the automatic bypass valve 300 includes a compression spring 320, a bypass valve 310, and a bypass shaft 340 that may be coupled to a base. The bypass valve may be configured to move in directions 322 along the bypass shaft 340. The bypass valve 310 is depicted in bottom view in FIG. 3B and may include a non-circular aperture 312 configured to receive the bypass shaft 340. The non-circular aperture 312 may allow water and debris to flow past the bypass valve 310 and the bypass shaft 340 even when the automatic bypass valve 300 is in a closed position.

FIGS. 4A-4E illustrate a bypass valve component of an automatic bypass valve in various views in accordance with one or more embodiments of the present disclosure. Other embodiments may have different configurations and/or may include additional, fewer, or different components. Some components may not be depicted at scale relative to other drawings.

Figure 4A:
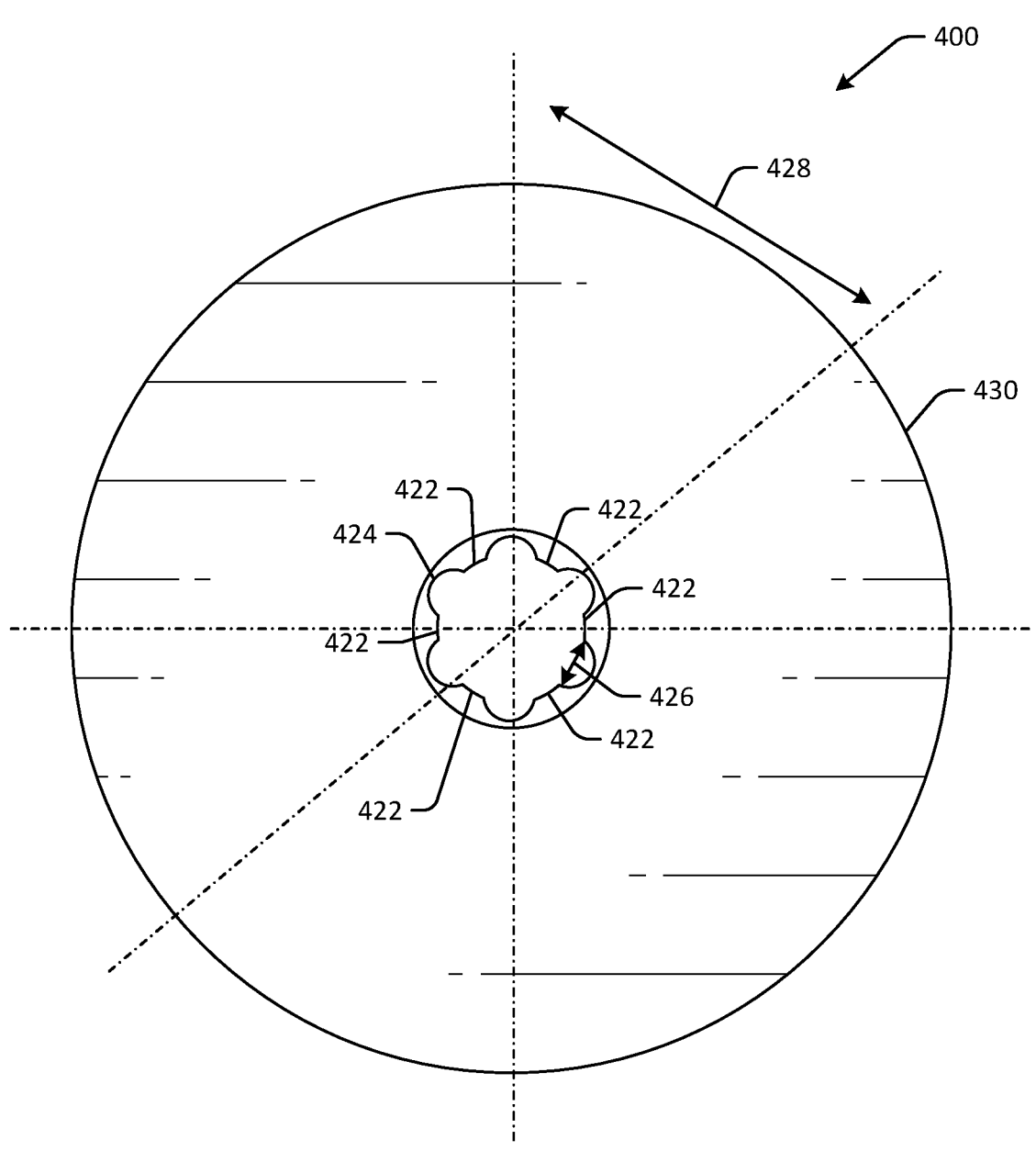

A bypass valve 400 is depicted in top view in FIG. 4A. The bypass valve 400 may be the same bypass valve discussed with respect to FIGS. 1A-3B. The bypass valve 400 is depicted in cross-sectional view in FIG. 4B, side view in FIG. 4C, bottom perspective view in FIG. 4D, and bottom view in FIG. 4E.

The bypass valve 400 may include a non-circular aperture disposed about a center of a base 430 of the bypass valve 400. The non-circular aperture may be configured to receive a bypass shaft, such that the bypass valve 400 can slide along the bypass shaft. The non-circular nature of the aperture or opening may allow debris and water to flow through the bypass valve 400 without clogging or causing jams.

In some embodiments, the non-circular opening may be a regular hexagonal shaped opening. The hexagonal shaped opening may have a plurality of semi-circular cutouts 424 at two or more vertices, as depicted in FIG. 4A. The semi-circular cutouts 424 may have diameters 426 of between 0.100 and 0.150 inches, such as 0.124 inches or 0.130 inches. In some embodiments, the non-circular opening may have at least six regions of contact 422 between the bypass valve 400 and the bypass shaft. In some embodiments, each region of contact 422 has a width of between 0.1 to 0.2 inches, such as between about 0.125 to about 0.175 inches, or such as 0.125 inches. In some embodiments, each region of contact 422 has a radius of between 0.15 to 0.20 inches, such as about 0.167 inches. In the illustrated embodiment, each region of contact 422 is separated from the adjacent regions of contact by an angle of 60° as depicted by the angle between lines indicated by arrows 428. Other embodiments may have different angular separation, such as 45°.

The non-circular opening may have a diameter 440 of between 0.40 and 0.50 inches, such as between 0.42 and 0.48 inches, or 0.45 inches. The bypass valve 400 may include a stem 452 and one or more fins 450. The stem 452 may have a length 438 of half a height 454 of the bypass valve 400. In some embodiments, the length 438 may be about 0.5 inches, such as between 0.4 and 0.6 inches, in which case the height 454 may optionally be about 1 inch. The fins 450 may have a height 436 of about 0.35 inches, such as between about 0.25 inches and about 0.50 inches. The base 430 may have a thickness 434 of about 0.15 inches, such as between about 0.12 and 0.18 inches.

It should be apparent that the foregoing relates only to certain embodiments of the present disclosure and that numerous changes and modifications may be made herein by one of ordinary skill in the art without departing from the general spirit and scope of the disclosure.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A pool heater comprising:
a header;
a heat exchanger;
a support; and
an automatic bypass valve coupled to the support, the automatic bypass valve comprising:
    a cylindrical bypass shaft;
    a bypass valve comprising a non-circular opening configured to receive the bypass shaft, wherein the bypass valve is configured to slide along the cylindrical bypass shaft responsive to water pressure in the header, and wherein water can flow through the non-circular opening when the bypass valve is in a closed position, and wherein the bypass valve is flush with the support in the closed position; and
    a spring disposed about the cylindrical bypass shaft, the spring configured to bias the bypass valve toward the closed position.

2. The pool heater of claim 1, wherein the automatic bypass valve is disposed downstream of a filter and upstream of the heat exchanger.

3. The pool heater of claim 1, wherein the non-circular opening is a hexagonal shaped aperture comprising a plurality of semi-circular cutouts.

4. The pool heater of claim 1, wherein the non-circular opening comprises at least six regions of contact between the bypass valve and the cylindrical bypass shaft.

5. The pool heater of claim 4, wherein each region of contact has a width of between 0.1 to 0.2 inches.

6. The pool heater of claim 4, wherein each region of contact has a radius of between 0.15 to 0.20 inches.

7. The pool heater of claim 4, wherein each region of contact is separated by 60° from adjacent regions of contact.

8. The pool heater of claim 1, wherein the support comprises a first portion having a first aperture, and a second portion having a second aperture, and wherein the cylindrical bypass shaft is disposed in the first aperture, such that a first end of the cylindrical bypass shaft is on a first side of the first portion, and a second end of the cylindrical bypass shaft is on a second side of the first portion.

9. The pool heater of claim 8, wherein the second end of the cylindrical bypass shaft is disposed in the second aperture, and wherein the automatic bypass valve further comprises a lug nut coupled to the second end of the cylindrical bypass shaft to secure the cylindrical bypass shaft to the support.

10. A heater comprising:

a heat exchanger; and an automatic bypass valve comprising:

a bypass shaft;

a spring disposed about the bypass shaft; and a bypass valve comprising an aperture configured to receive the bypass shaft, wherein water can flow through at least a portion of the aperture when the bypass valve is in a closed position, and wherein the aperture is a hexagonal shaped aperture comprising a plurality of semi-circular cutouts.

11. The heater of claim 10, further comprising:

a support;

wherein the automatic bypass valve is coupled to the support.

12. The heater of claim 10, wherein the bypass valve is configured to slide along the bypass shaft responsive to water pressure in the heat exchanger.

13. The heater of claim 10, wherein the automatic bypass valve is disposed downstream of a water filter and upstream of the heat exchanger.

14. The heater of claim 10, wherein the aperture comprises at least six regions of contact between the bypass valve and the bypass shaft.

15. The heater of claim 14, wherein each region of contact has a width of between 0.1 to 0.2 inches.

16. The heater of claim 10, wherein each region of contact has a radius of between 0.15 to 0.20 inches.

17. The heater of claim 10, wherein the spring is configured to bias the bypass valve toward the closed position.

18. A pool heater comprising:

a heat exchanger;

a support; and an automatic bypass valve coupled to the support, the automatic bypass valve comprising:

a bypass shaft;

a spring disposed about the bypass shaft; and a bypass valve comprising a non-circular aperture configured to receive the bypass shaft, wherein debris can flow through at least a portion of the non-circular aperture when the bypass valve is in a closed position;

wherein the non-circular aperture comprises at least six regions of contact between the bypass valve and the bypass shaft, and wherein each region of contact is separated by 60° from adjacent regions of contact.

\* \* \* \* \*